Jan. 16, 1934. E. G. CARROLL 1,943,886
BRAKE APPARATUS
Filed Oct. 29, 1928 2 Sheets-Sheet 1

INVENTOR.
Eugene G. Carroll.
BY Lyon & Lyon
Att'ys

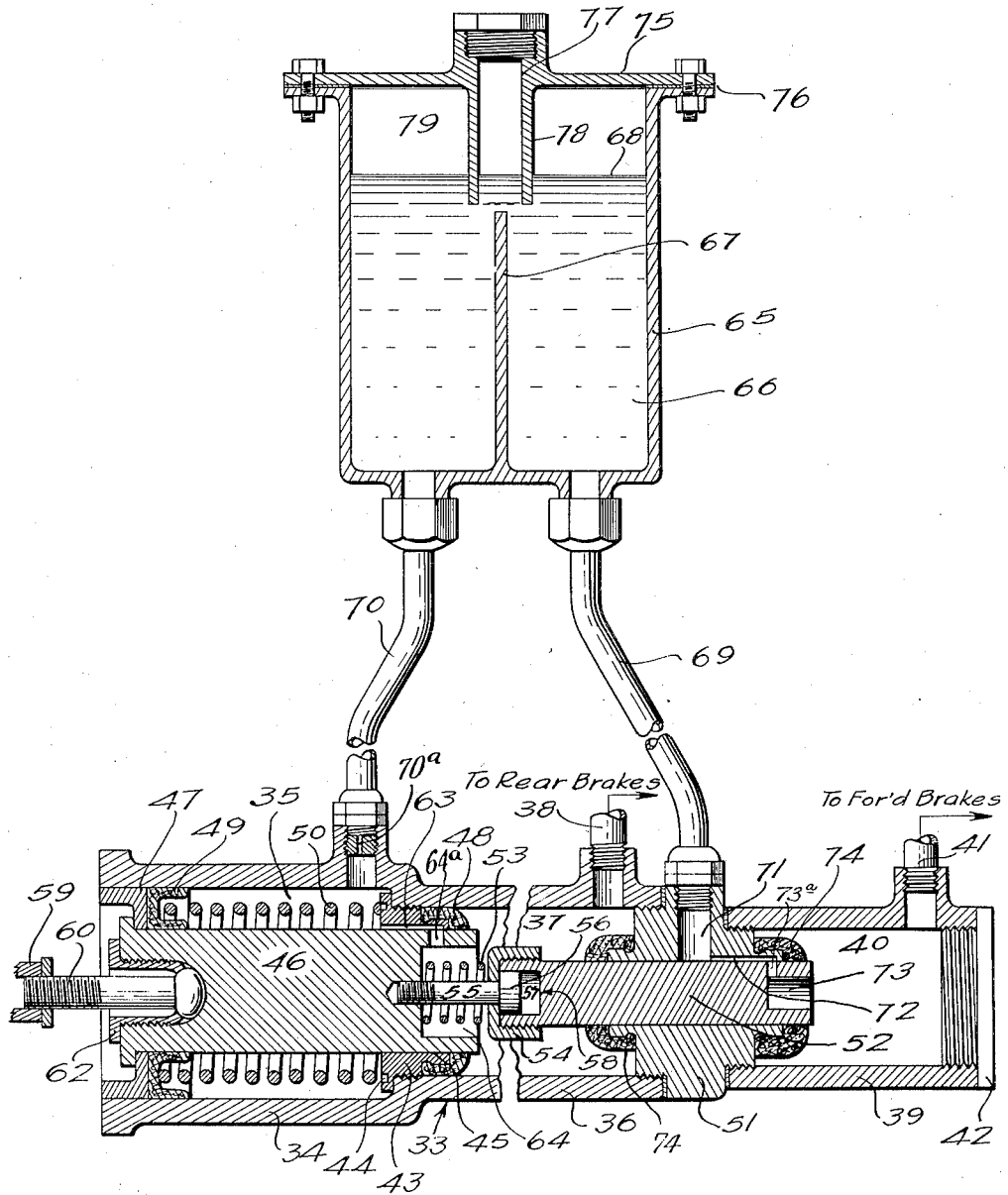

Patented Jan. 16, 1934

1,943,886

UNITED STATES PATENT OFFICE 1,943,886

BRAKE APPARATUS

Eugene G. Carroll, Los Angeles, Calif., assignor, by mesne assignments, to Bendix Brake Company, South Bend, Ind., a corporation of Illinois Application October 29, 1928. Serial No. 315,630

32 Claims. (Cl. 60—54.6)

This invention relates to fluid pressure apparatus and while the invention may be used in any fluid pressure apparatus employed for developing pressure in a fluid for any purpose whatever, the invention is particularly useful when applied for actuating fluid-actuated brakes, such as used in an automobile. Although the invention can be used where the operating fluid is compressed air, in the present specification it is described as applied to a hydraulic brake apparatus.

In the use of hydraulic brake apparatus, difficulty is experienced on account of leakage, and also, sometimes there is a tendency for air to accumulate in the system in such a way as to interfere with the reliable operation of the brakes. In such apparatus a master cylinder is usually employed in which the fluid is compressed by a foot pedal that operates a plunger in the cylinder.

In order to insure a sufficient supply of operating fluid, some hydraulic brake apparatus includes a reservoir maintained in communication with the master cylinder through a port in the cylinder when the plunger is in its withdrawn position. In using such a reservoir, however, there is a tendency to produce a retarded development of the operating pressure ahead of the plunger due to the fact that the operating liquid escapes through this port connection until it becomes closed. In other words, there is a tendency to retard the development of the operating pressure on account of the presence of this port.

The use of cylinders heretofore has necessitated the provision of smooth bores in the cylinders in order to insure fluid-tight operation of the pistons or plungers that operate in the bores.

The general object of this invention is to overcome these difficulties and to provide a simple fluid pressure apparatus which will be reliable in operation and which will operate to develop the required pressure at an early point in the forward movement of the plunger that develops the pressure. As applied to a hydraulic brake apparatus, the general object of the invention is to provide simple apparatus for this purpose, constructed in such a way as to avoid leakage from the system, and so as to insure an ample supply of the operating liquid to the master cylinder and brake cylinders.

A further object of the invention is to construct the apparatus in such a way that a relatively higher pressure is developed in the rear brake cylinders as compared with the forward brake cylinders, the purpose being to develop a relatively smaller braking action on the forward wheels, which is desirable.

A further object of the invention is to provide a construction for the master cylinder which will have the effect of automatically building up a pressure above atmosphere in the system and which will operate to boost or supercharge the pressure in the brake cylinders immediately when the plunger commences to advance.

A further object of the invention is to improve the general construction of fluid-actuated pressure apparatus, and also to improve the construction of master cylinders and brake cylinders.

Further objects of the invention will appear hereinafter.

The invention consists in the novel parts and combination of parts to be described hereinafter, all of which contribute to produce an efficient brake apparatus.

A preferred embodiment of the invention is described in the following specification, while the broad scope of the invention is pointed out in the appended claims.

In the drawings:

Figure 3 is a vertical section illustrating the master cylinder and a pressure reservoir which may be employed with it, certain parts being broken away.

Figure 1:
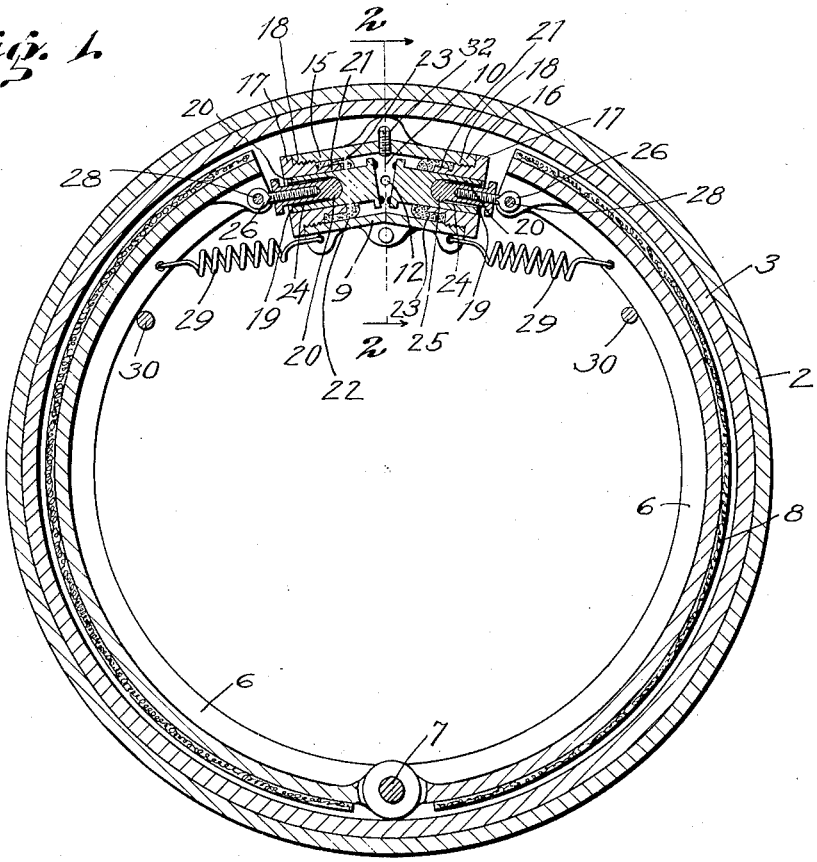
Figure 1 is a vertical section through a brake apparatus embodying my invention and taken in a plane at right angles to the axis of rotation of the wheel or drum to which the brake is applied.

Before proceeding to a detailed description of the invention, it will facilitate the disclosure to state that according to my invention, in the construction of the master cylinder I provide a plunger having a head working in a booster chamber or bore connected with a reservoir for the operating fluid or liquid. In the normal, or withdrawn position of the plunger, this chamber is in communication with another chamber in which the pressure is developed to serve the brake cylinders or other devices served by the apparatus. When the plunger is advanced, the immediate effect of the advance is to increase the pressure in the reservoir and in the booster cylinder associated with the apparatus. After a slight movement of the plunger has taken place, the actuating cylinder is cut off from communication with the first cylinder to enable the actuating pressure to be developed. In this way, there can be no loss of pressure in the actuating cylinder when the plunger commences to move, in fact, an increase of pressure commences in both cylinders or chambers immediately when the plunger begins its advance. In other words, I provide what might be called a "booster" cylinder co-operating with the regular compression cylinder or chamber of the master cylinder, the effect of the booster cylinder being to increase the pressure in the regular compression cylinder and maintain a plentiful supply of the operating liquid for it. When communication of the supply liquid to the compression cylinder is cut off, the actuating pressure is immediately developed in the compression cylinder.

The pressure reservoir employed in connection with the system is not completely filled with the operating liquid when used with a hydraulic system, and this reservoir is so constructed that an air chamber containing compressed air exists in the reservoir. The immediate effect of the first part of the forward movement of the plunger is to raise the level of the liquid in this reservoir and increase the pressure in it.

In brake apparatus where the forward brakes are served by a different cylinder from that which serves the rear brakes, I utilize this increase in pressure in the reservoir to supercharge or increase the pressure in the cylinder that supplies the liquid to the forward brakes. In this way I insure a plentiful supply of the operating liquid to both sets of brakes.

In hydraulic brake apparatus it has been customary in the past to employ a plunger having a head with suitable packing moving in a smooth bore of a cylinder. In practicing my invention this is unnecessary, and I provide a construction for the compressing cylinders that avoids the necessity for using a piston with a head filling the bore of the cylinder. The plunger is in the form of a headless plunger or bar that does not touch the bore of the cylinder, but merely slides through a fixed head of the cylinder, where it can be very readily packed, and develops pressure simply by reducing the effective volume of the cylinder. I employ this construction for the compression cylinders or bores of the master cylinder, and also for the brake cylinders.

In the preferred embodiment of the invention, I provide a compression cylinder corresponding to the rear brakes and a separate compression cylinder corresponding to the forward brakes. This arrangement is desirable because if any accident occurs to the rear brake system, the forward brake system may still be employed, and vice versa. In the preferred embodiment of the invention these two compression cylinders are placed in tandem with each other, and the plunger which operates in the compression cylinder for the rear brakes is connected with a smaller plunger that operates in the compression cylinder for the forward brakes. Between these two plungers I prefer to provide a yielding connection that in operation will develop a slightly less pressure in the forward compression cylinder, thereby insuring that the forward brakes will be applied less forcibly than the rear brakes.

In practicing the invention as applied to a hydraulic brake apparatus, I provide a brake cylinder with a chamber within it to receive the actuating fluid under pressure. According to my invention it is not necessary to provide a bore within the cylinder for the plunger and I do not employ any head on the plunger, guided on the cylinder wall. It is therefore unnecessary to provide packing between the plunger and the cylinder wall, which packing heretofore has been generally used in practice. It has the disadvantage that if it permits leakage, it detracts from the holding power of the brake. According to my invention, I provide the end of the cylinder with a head having a bore through it, and this bore operates as a guide for the plunger, the inner end of which is disposed within the pressure chamber of the cylinder.

I provide packing for the plunger where it slides through the head. The head is detachably mounted in the end of the cylinder so that when desired it can be removed to repack the plunger. The packing is located on the inner end of the head around the plunger and the pressure on the interior of the cylinder assists in holding the packing tight around the plunger.

Figure 2:
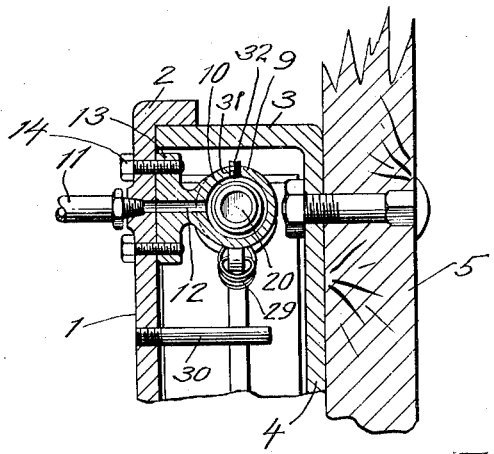
Figure 2 is a section taken on the line 2—2 of Figure 1.

In the embodiment of the invention illustrated in Figures 1 and 2, 1 represents a brake housing in the form of a disc having a flange 2 around its edge. This flange laps over a flange 3 on a disc 4 that is attached to the wheel 5 or other part to which the brake is to be applied. This type of brake illustrated is a drum type of brake such as ordinarily used in automobiles. The brake is an inside expanding brake and is formed of two brake sections or shoes 6 of arcuate form attached to a common pivot pin or "anchor" 7 on the housing, and provided with brake liners 8 on their outer faces to engage with the inner face of the drum flange 3.

On the inner face of the housing I attach a brake cylinder 9 and this cylinder has a chamber 10 on its interior to receive actuating fluid through a pipe connection 11 communicating with a port 12 leading through the bracket 13 of the cylinder into the chamber 10. This bracket 13 may be attached to the housing 1 by means of bolts 14. The cylinder 9 in the present instance is a double ended cylinder, that is to say, it has a working plunger at each end. In the present instance, this cylinder is of V form, so that it consists of two sections 15 and 16 cast integral with each other, the axis of each section forming an obtuse angle with the axis of the other section.

Each end of the cylinder 9 is provided with a detachable head 17. These heads are preferably secured in place by means of a thread connection 18. Each head 17 has a bore 19 through it which operates as a guide for a plunger 20. These plungers do not engage the bore of the cylinder 9 but their inner ends extend into the chamber 10, so as to come under the influence of the fluid pressure existing therein.

The inner end of each head 17 is formed with a reduced extension 21 around which a packing-ring 22 is placed. This packing-ring has a portion that extends into the annular space 23 between the extension 21 and the wall of the cylinder 9, and its body seats on the end of the extension 21. With this arrangement for the packing, it will be evident that the pressure developed within the chamber 10 will tend to press the packing closely around the plunger 20 and pack it at the point where it passes through the head 17.

In order to impart braking movement to the brake sections 6, each plunger is connected with the free end of the brake section, that is to say, the end remote from the anchor or pivot. For this purpose, each plunger is provided at its outer end with a deep recess 24 and receives the inner end of an adjustable strut-link. Each strut-link has a rounded head 25 that seats in the rounded inner end of the recess 24. The strut-link includes an adjustable section 26 in the form of an eyebolt, the eye of which is attached by a pivot pin 28 to the free end of the corresponding brake section.

The brake sections are held "off" or out of contact with the brake drum by coil springs 29, the inner ends of which are attached to lugs cast on the cylinder 9, and the outer ends of which are hooked into the corresponding brake section. These springs hold the brake sections up against stop pins 30 that project in from the side of the housing.

In the operation of the brake, when the pressure is developed in the chamber 10, the plungers will be forced outwardly and this will move the brake shoes or sections 6 outwardly against the inner face of the drum.

If desired, the upper side of the cylinder 9 may be provided with a threaded opening 31 closed by a removable screw 32. This removable screw will give access to the interior of the cylinder without necessitating taking out the heads 19. By disconnecting the pin 28 of either of the eye-bolts 26, the eye-bolt can be slightly rotated in either direction to adjust the length of the strut-link of which it forms a part. This enables the position of the brake shoe to be adjusted with respect to the face of the drum.

Referring to Figure 3, 33 represents a master cylinder, one end of which is formed into a booster cylinder 34 having a chamber or bore 35 of relatively large diameter. In tandem with this booster cylinder 34, I provide a compression cylinder 36, having a chamber or bore 37 with a connection 38 leading to the rear brakes of the car, in case the system is to be used where separate cylinders are provided for the forward and rear brakes.

Connected in tandem with the compression cylinder 36, I provide a smaller compression cylinder 39 having a relatively small chamber or bore 40, and this chamber is connected by a connection 41 with the forward brakes. The outer end of the cylinder 40 may be closed by a screw plug 42. In the present instance I provide a fixed head 43 separating the booster chamber 35 from the compression chamber or bore 37 which is of relatively smaller diameter than the bore 35. This fixed head may be in the form of a plug screwed into the end of the bore 37, and provided with sockets 44 for a spanner wrench. This head 43 is practically a bushing having a bore 45 through it to guide a plunger 46 in the form of a cylindrical bar, the outer end of the said plunger being provided with a head 47 sliding in the bore 35. The inner end of the head or bushing 43 is provided with a packing-ring 48 that packs against the side face of the plunger 46. The head 47 of the plunger 46 may be packed in any suitable manner, for example, by means of a cup leather 49 held against the inner face of the piston by a coil spring 50. This spring will be referred to hereinafter.

A somewhat similar construction is employed for connecting the chambers 37 and 40, including a fixed head 51 which has a thread connection on each side with the cylinders which it connects. Through this fixed head 51 a plunger 52 slides, said plunger being of smaller diameter than the plunger 46 and being connected with the plunger 46 in such a way that when the plunger 46 is advanced in the operating movement, the plunger 52 will also advance, thereby compressing fluid in the chamber 40. The connection between the plungers is preferably a yielding connection including a coil spring 53 that seats against one end of the plunger 46 and at its other end against a screw cap 54 attached to the end of the plunger 52. A bolt 55 extends through the cap 54 and is secured in the end of the plunger 46 to limit the distance that the plungers 46 and 52 can be moved apart. In other words, the spring 53 is in compression and holds the cap 54 against the face of the head 56 of the bolt. The bolt-head 56 is received loosely in a chamber 57 in the end of the plunger which provides clearance permitting considerable movement of the bolt-head 56 in the direction of the bore 40. The result of this is that when the plunger 46 moves toward the right the force that moves the plunger 52 is imparted to it through the spring 53. This spring is of such strength that it will yield slightly when the plungers are moved, thereby imparting a reduced amount of movement to the plunger 52 and thereby developing less pressure in the forward brakes than in the rear brakes. In case the rear brake system is out of order and not supplied with fluid under pressure, the plunger 46 can still operate the plunger 52 through the spring 53, and after compression of the spring 53 sufficiently, by the direct contact of the head 56 with the end face 58 of the plunger 52 which forms one end of the chamber 57.

Any suitable means may be provided for operating the plunger 46. In practice, in a hydraulic brake apparatus, this is usually effected by a brake pedal, operating through an adjustable connection 59 including a stem 60 with a rounded head 61 thrusting against the end of the plunger and retained by a bushing 62 screwed into the end of the plunger.

I provide means for supplying fluid or liquid under pressure to the booster cylinder 34 and to the chambers 37 and 40. I prefer, however, to supply the chamber 37 from the chamber 35 through a by-pass port or passage 63 which is associated with the plunger 46 and preferably in the form of an elongated passage formed in the face of the head 43 and communicating through a port 64ª in the plunger with a counter-bore 64 in the end of the plunger that is exposed to the interior of the chamber 37. I also provide a pressure reservoir 65 which may be of dual form providing twin containers 66 with a partition wall 67 separating the same, but permitting communication if the level 68 of the operating liquid is sufficiently high. One of the containers 66 is connected by a pipe 70 with the chamber 35. A relatively small passage 70ª is provided in this connection. The other container is connected by a pipe 69 with the fixed head 51, said head having a large radial passage 71 formed in it exposed at its inner end to the side of the plunger 52.

Associated with the plunger 52, I provide a port which communicates with the passage 71 in the withdrawn position of the plunger 52, as illustrated in Figure 3. For this purpose I provide a port 72 in the inner face of the head 51 which communicates at its right end through a port 73ª in the plunger with a counter-bore 73 in the end of the plunger and communicating with the interior of the third chamber 40.

At both points where the plunger 52 emerges from the head 51, I provide suitable packing-rings 74 that keep this plunger substantially fluid-tight.

In order to enable the system to operate with a pressure slightly higher than atmosphere and thereby insure that no partial vacuum will be developed at any point in the system which might have the effect of admitting atmospheric air, I provide the upper end of the reservoir 65 with an airtight head 75 held securely on a gasket 76.

In the operation of the system, the reservoir cannot be completely filled with the liquid by reason of the fact that I provide the filling or inlet opening 77 with a downwardly projecting sleeve 78. This sleeve prevents the reservoir from being completely filled with the liquid because as the level rises, an air pocket or chamber 79 will be formed under the head.

The area of the plunger 52 is preferably one-half of the area of the plunger 46. This correlation gives a desirable mode of operation in that when the plungers move forward, there will be substantially the same amount of liquid displaced from the chamber 37 as from the chamber 40.

In the operation of the master cylinder embodying the features described, when the plunger 46 advances, fluid or liquid in the chamber 35 will be displaced by the advancing head 47. Some of this liquid will tend to flow through the port 63, further compressing the liquid already in the chamber 37, and some of the liquid will flow up the pipe 70, raising the level 68 of the liquid in the reservoir and further compressing the compressed air in the air pocket 79. This increase in pressure in the reservoir at this time is desirable because it increases the pressure of the liquid in the pipe 69 and this communicates with the interior of the chamber 40 through the port 72, thereby increasing the initial pressure in this chamber. This initial increase in pressure caused by the booster cylinder in the chambers 37 and 40 immediately increases the pressure in the brake cylinders and, one might say, sets them in readiness for immediately applying the brakes upon the further movement of the plungers 46 and 52. As soon as the plunger moves to the right sufficiently, it will close the port 63 at its right end, and when this closes, all the liquid in the chamber 37 will be trapped therein and the pressure will immediately rise in the connection 38 and in the rear brake cylinders. Likewise, when the plunger 52 moves to the right sufficiently to close the right end of the port 72, the liquid in the chamber 40 will be trapped and the pressure will immediately rise therein and apply the brakes of the forward wheels.

The time of closing the port 63 can be very accurately determined by lengthening or shortening this port. If quick closing of the port is desired, the port would be made relatively short. This is also true of the port 72.

If the connection between the plungers 46 and 52 had no lost motion, such as illustrated, the same pressure would be developed in the forward brake cylinders as the rear brake cylinders, but by reason of the spring 53 a slight compression of the spring will take place in transmitting the movement from the plunger 46 to the plunger 52, and this will cause slightly less displacement of liquid in the chamber 40, thereby slightly reducing the pressure in the forward brake cylinders as compared to the pressure in the rear brake cylinders.

Attention is called to the use of the fixed heads 43 and 51. By employing these heads I avoid the necessity for accurately boring the chambers of the cylinders 36 and 39, because their plungers do not come in contact with the walls of these cylinders. This arrangement is also advantageous because it is much easier to make a liquid-tight connection between the plungers and the fixed heads than it is between a head moving in a bored cylinder.

The principal function of the spring 50 is to hold the cup 49 in position; also to act as a retraction spring to return the plunger 46 to its normal position after it has been actuated.

By reason of the fact that the passage 70$^a$ is small, a choking effect occurs when the plunger 46 is actuated, immediately raising the pressure in the booster chamber 35 and communicating this pressure through the by-pass 63 and port 64$^a$ to the compression chamber 37. When the master cylinder first commences to operate, on the return stroke of the plunger 46, a partial vacuum will be developed in the booster chamber 35 by reason of the restricted passage 70$^a$. This operates to admit air past the head 47 and the cup ring 49. This air finds its way up the connection 70 and into the air chamber 79. In this way the operation of the master cylinder automatically develops air pressure in the air chamber 79.

It is understood that the embodiment of the invention described herein is only one of the many embodiments this invention may take, and I do not wish to be limited in the practice of the invention, nor in the claims, to the particular embodiment set forth.

What I claim is:

1. In a fluid pressure apparatus, the combination of a booster cylinder, a compression cylinder, means for supplying the operating fluid to the booster cylinder, means for simultaneously developing pressure in the booster cylinder and in the compression cylinder, including a plunger in the booster cylinder, means for advancing the plunger, means for returning the plunger and normally holding the same in its withdrawn position, said plunger having a port formed therein emerging on the side face thereof opening communication between the booster cylinder and the compression cylinder when the plunger is in its withdrawn position, said port operating to close when the plunger is moved forward to develop pressure in the compression cylinder, and a connection from the compression cylinder for delivering fluid under pressure from the same.

2. In fluid pressure apparatus, the combination of a cylinder having a chamber of relatively large diameter and a chamber of relatively smaller diameter, a plunger with a piston head filling the bore of the larger chamber, a fixed head separating the larger chamber from the smaller chamber and having a guide opening therethrough for the plunger, a passage for connecting the chambers, means for supplying operating fluid to the chambers, said first named chamber co-operating with its plunger to force a portion of the operating fluid through the passage into the second named chamber at the commencement only of the forward stroke of the plunger and a connection from the smaller chamber for delivering fluid under pressure from the same.

3. In fluid pressure apparatus, the combination of a cylinder having a chamber of relatively large diameter and a chamber of relatively smaller diameter, a plunger with a piston head filling the bore of the larger chamber, a fixed head separating the larger chamber from the smaller chamber and having a guide opening therethrough for the plunger, said plunger having a passage in its face connecting the two chambers when the plunger is in its withdrawn position, means for supplying operating fluid to the chambers, said first named chamber cooperating with its plunger to force a portion of the operating fluid through the passage into the second named chamber at the commencement only of the forward stroke of the plunger and a connection leading from the smaller chamber for delivering fluid under pressure from the same.

4. In fluid pressure apparatus, the combination of a cylinder having a chamber of relatively large diameter and a chamber of relatively smaller diameter, a plunger with a piston head filling the bore of the larger chamber, a fixed head separating the larger chamber from the smaller chamber and having a guide opening therethrough for the plunger, means for supplying operating fluid to the larger chamber, a connection from the smaller chamber for delivering the fluid under pressure from the same, means connected with the plunger for advancing it, means for returning the plunger after it has been advanced and for normally holding the same in a withdrawn position, and means for maintaining communication between the two chambers when the plunger is in said withdrawn position.

5. In fluid pressure apparatus, the combination of a cylinder having a chamber of relatively large diameter and a chamber of relatively smaller diameter, a plunger with a piston head filling the bore of the larger chamber, a fixed head separating the larger chamber from the smaller chamber and having a guide opening therethrough for the plunger, means for supplying operating fluid to the larger chamber, a connection from the smaller chamber for delivering fluid under pressure from the same, means for forcing the plunger forward, means for returning the plunger and normally holding the same in its withdrawn position, and a passage associated with the plunger for maintaining open communication between the two chambers when the plunger is in its withdrawn position.

6. In fluid pressure apparatus, the combination of a cylinder having a chamber of relatively large diameter and a chamber of relatively smaller diameter, a plunger with a piston head filling the bore of the larger chamber, a fixed head separating the larger chamber from the smaller chamber and having a guide opening therethrough for the plunger, means for supplying operating fluid to the larger chamber, a connection from the smaller chamber for delivering fluid under pressure from the same, means for forcing the plunger forward, means for returning the plunger and normally holding the same in its withdrawn position, and a passage formed between the plunger and the fixed head for opening communication between the two chambers when the plunger is in said withdrawn position, and operating to close as the plunger moves forwardly to develop pressure in the smaller chamber.

7. In fluid pressure apparatus, the combination of a cylinder having a chamber of relatively large diameter and a chamber of relatively smaller diameter, a plunger with a piston head filling the bore of the larger chamber, a fixed head separating the larger chamber from the smaller chamber and having a guide opening therethrough for the plunger, means for supplying operating fluid to the larger chamber, a connection from the smaller chamber for delivering fluid under pressure from the same, means for forcing the plunger forward, means for returning the plunger and normally holding the same in its withdrawn position, said plunger having a port opening communication between said chambers when the plunger is in said withdrawn position, and operating to close when the plunger is moved forwardly to develop pressure in the smaller chamber.

8. In fluid pressure apparatus, the combination of a cylinder having a chamber of relatively large diameter and a chamber of relatively smaller diameter, a plunger with a piston head filling the bore of the larger chamber, a fixed head separating the larger chamber from the smaller chamber and having a guide opening therethrough for the plunger said plunger having a passage opening communication between the first named chamber and the second named chamber when the plunger is in its withdrawn position, a cylinder with a bore of smaller diameter than the smaller chamber located beyond the smaller chamber, with a fixed head separating the two smaller chambers, a second plunger connected with the first named plunger and guided through the second named fixed head into the smallest chamber, said first named chamber cooperating with its plunger to force a portion of the operating fluid through the passage into the second named chamber at the commencement only of the forward stroke of the plunger, and connections from the two smaller chambers for delivering fluid under pressure from the same.

9. In fluid pressure apparatus, the combination of a cylinder having a booster chamber of relatively large diameter and a chamber of relatively smaller diameter, a plunger with a piston head filling the booster chamber, a fixed head separating the larger chamber from the smaller chamber and having a guide opening therethrough for the plunger, a cylinder with a bore of smaller diameter than the smaller chamber located beyond the smaller chamber, with a fixed head separating the two smaller chambers, means cooperating with the booster chamber to pass operating fluid from the booster chamber at the commencement of the forward stroke, into the said second named chamber, a second plunger connected with the first named plunger and guided through the second named fixed head into the smallest chamber, connections from the two smaller chambers for delivering fluid under pressure from the same, and means for supplying fluid under pressure to all the bores.

10. In a fluid pressure apparatus, the combination of a cylinder having a bore of relatively large diameter, and a second bore of relatively smaller diameter, a plunger with a piston head filling the larger bore, a fixed head separating the larger bore from the second bore and having a guide opening therethrough for the plunger, means for supplying operating fluid to the two bores, a connection from the smaller bore for delivering fluid under pressure from the same, a third bore of smaller diameter than the second bore located beyond the same, with a fixed head separating the two smaller bores, a second plunger guided through the last named head and connected with the first named plunger so as to advance with the first named plunger, a connection leading from the third bore for delivering fluid under pressure from the same, means for advancing the plungers to develop pressure in the bores, means for returning the plungers and for normally holding the same in a withdrawn position, means for opening communication between the first bore and the second bore when the plungers are in their withdrawn position, and means for supplying the operating fluid to the third bore when the plungers are in said withdrawn position.

11. In a fluid pressure apparatus, the combination of a cylinder having a bore of relatively large diameter, and a second bore of relatively smaller diameter, a plunger with a piston head filling the larger bore, a fixed head separating the larger bore from the second bore and having a guide opening therethrough for the plunger, means for supplying operating fluid to the two bores, a connection from the smaller bore for delivering fluid under pressure from the same, a third bore of smaller diameter than the second bore located beyond the same, with a fixed head separating the two smaller bores, a second plunger guided through the last named head and connected with the first named plunger so as to advance with the first named plunger, a connection leading from the third bore for delivering fluid under pressure from the same, means for advancing the plungers to develop pressure in the bores, means for returning the plungers and for normally holding the same in a withdrawn position, said first named plunger having a port opening communication between the first chamber or bore and the second chamber or bore when the plungers are in their withdrawn position, and operating to close after the plungers have advanced through a part of their forward movement, to enable pressure to be developed in the second bore, said second plunger having a port with means communicating with the same to supply the operating fluid to the third bore when the plungers are in said withdrawn position, and operating to close when the plungers have advanced through part of their forward movement, to develop pressure in the third bore.

12. In a fluid pressure apparatus, the combination of a cylinder having a bore of relatively large diameter, and a second bore of relatively smaller diameter, a plunger with a piston head filling the larger bore, a fixed head separating the larger bore from the second bore and having a guide opening therethrough for the plunger, means for supplying operating fluid to the two bores, a connection from the smaller bore for delivering fluid under pressure from the same, a third bore of smaller diameter than the second bore located beyond the same, with a fixed head separating the two smaller bores, a second plunger guided through the last named head and connected with the first named plunger so as to advance with the first named plunger, a connection leading from the third bore for delivering fluid under pressure from the same, means for advancing the plungers to develop pressure in the bores, means for returning the plungers and for normally holding the same in a withdrawn position, means for opening communication between the first bore and the second bore when the plungers are in their withdrawn position, and means for supplying the operating fluid to the third bore when the plungers are in said withdrawn position, the said connection between the plungers including yielding means permitting a greater forward movement of the first plunger than the second plunger when the same move forwardly, operating to develop a relatively lower pressure in the third bore than in the second bore.

13. In fluid pressure apparatus, the combination of a cylinder having a booster chamber with a bore of relatively large diameter and a second bore of relatively smaller diameter, a plunger with a piston head filling the larger bore, a fixed head separating the larger bore from the smaller bore, and having a guide opening therethrough for the plunger, a third bore disposed beyond the second bore, a second plunger connected with the first plunger and operating to develop pressure in the third bore, a pressure reservoir, means for supplying the operating fluid therefrom to the first bore and the third bore, and means for enabling the fluid under pressure in the booster chamber to flow into the second named bore at the commencement of the forward stroke.

14. In fluid pressure apparatus, the combination of a cylinder having a chamber of relatively large diameter and a chamber of relatively smaller diameter, a plunger with a piston head filling the bore of the larger chamber, a fixed head separating the larger chamber from the smaller chamber and having a guide opening therethrough for the plunger, a third bore beyond the second bore with a head between the same, a second plunger guided through the last named head and connected with the first plunger to advance therewith, a pressure reservoir for the operating fluid, means connecting the reservoir with the first chamber or bore, means connecting the reservoir with the second named fixed head, means for advancing the plungers, means for returning the plungers and for holding the same normally in a withdrawn position, said first named plunger having a port opening communication between the first chamber or bore and the second chamber or bore when the plungers are in the said withdrawn position, said second plunger having a port opening communication between the reservoir and the third bore when the plungers are in their said withdrawn position, a connection from the second chamber or bore for supplying fluid under pressure from the same, and a connection from the third bore for supplying fluid under pressure from the same.

15. In a fluid pressure brake apparatus for an automobile, the combination of a cylinder having a chamber of relatively large diameter and a chamber of relatively smaller diameter, a plunger with a piston head filling the larger chamber, a fixed head separating the larger chamber from the smaller chamber and having a guide opening therethrough for the plunger, a third chamber beyond the second chamber with a head between the second and third chambers, a second plunger guided through the last named head and connected with the first plunger to advance therewith, a pressure reservoir for the operating fluid, means connecting the reservoir with the first chamber, means connecting the reservoir with the second named fixed head, means for advancing the plungers, means for returning the plungers and for holding the same normally in a withdrawn position, said first named plunger having a port opening communication between the first chamber and the second chamber when the plungers are in the said withdrawn position, said second plunger having a port opening communication between the reservoir and the third chamber when the plungers are in their said withdrawn position, a connection from the second chamber for supplying fluid under pressure to the rear brakes, and a connection from the third chamber for supplying fluid under pressure to the forward brakes.

16. In a fluid pressure brake apparatus for an automobile, the combination of a cylinder having a chamber of relatively large diameter and a chamber of relatively smaller diameter, a plunger with a piston head filling the larger chamber, a fixed head separating the larger chamber from the smaller chamber and having a guide opening therethrough for the plunger, a third chamber beyond the second chamber with a head between the second and third chambers, a second plunger guided through the last named head and connected with the first plunger to advance therewith, a pressure reservoir for the operating fluid, means connecting the reservoir with the first chamber, means connecting the reservoir with the second named fixed head, means for advancing the plungers, means for returning the plungers and for holding the same normally in a withdrawn position, said first named plunger having a port opening communication between the first chamber and the second chamber when the plungers are in the said withdrawn position, said second plunger having a port opening communication between the reservoir and the third chamber when the plungers are in their said withdrawn position, a connection from the second chamber for supplying fluid under pressure to the rear brakes, and a connection from the third chamber for supplying fluid under pressure to the forward brakes, the connection between the first plunger and the second plunger including a spring operating to yield when the plungers are advanced and thereby develop lower pressure in the fluid serving the forward brakes than in the fluid serving the rear brakes.

17. In fluid pressure apparatus, the combination of a cylinder having a chamber therein, a head closing the chamber at one end, a plunger guided to slide through the head out of contact with the wall of the chamber, operating to develop pressure within the chamber when the plunger advances, and means for packing the plunger where it passes through the head, said plunger having a passage in its side face leading to said chamber and said head having a passage communicating with the space in the rear of said head and registering with the first named passage when the plunger is in its withdrawn position so as to open communication from the said chamber into the space in rear of said head.

18. In a fluid-actuated brake, the combination of a brake cylinder having a chamber within the same for the actuating fluid, a head detachably secured to said cylinder at the outer end of said chamber, said cylinder having a relatively large bore, a plunger guided in said bore with its inner end out of contact with the wall of said chamber, means for packing the plunger at said head, and means for connecting the forward end of the cylinder to the brake, said plunger having a passage in its side face leading to said connecting means and said head having a passage communicating with the first named passage when the plunger is in its withdrawn position and communicating at all times with said chamber so as to open communication from said chamber to said brake.

19. In a fluid actuated brake controlled by a pedal the combination of wheel brakes, a master cylinder having a chamber within the same adapted to contain actuating fluid, a head detachably secured within the cylinder at one end of the chamber and formed with an opening, a head detachably secured within the cylinder at the other end of the chamber and formed with an opening, a plunger corresponding to the opening in the first named head and carried through the same and having a smaller diameter than the chamber so that the plunger is out of contact with the wall, the chamber of a plunger corresponding to the opening in the second head and carried through the same and having a smaller diameter than the chamber so that the plunger is out of contact with the wall of the chamber, means for connecting a portion of the cylinder forward of one head with some of said wheel brakes, means for connecting a portion of the cylinder forward of the other head with others of the wheel brakes, and means for operating the plungers by the controlling pedal, each head being formed with a port through which liquid may at times pass, and each plunger being formed with a port through which liquid may also at times pass and which at times communicates with the port in its associated head, one of said ports associated with each head and plunger leading rearward from said head and the other opening associated with said head and plunger leading forward of said head.

20. In hydraulic brake apparatus, a cylinder, an annular head in said cylinder secured in fluid tight relationship with the sides thereof, a flexible packing associated with said head, and a cylindrical plunger formed with a central recess and a port adapted at times to allow liquid to flow around said annular head, mounted for movement in fluid tight relationship through said head and packing.

21. In fluid pressure apparatus, the combination of a cylinder having a compression chamber and having a booster chamber, a plunger having a head moving in the booster chamber, said cylinder having a by-pass connection from the interior of the booster chamber into the compression chamber, said by-pass being open when the plunger is in its normal withdrawn position, and a reservoir for the operating fluid having a connection with a restricted passage leading into the booster cylinder, said restricted passage operating to choke the outlet from the booster chamber to the reservoir when the plunger is actuated and thereby develop pressure in the booster chamber.

22. In fluid pressure apparatus, the combination of a cylinder having a compression chamber and having a booster chamber, a plunger having a head moving in the booster chamber, said cylinder having a by-pass connection from the interior of the booster chamber into the compression chamber, said by-pass being open when the plunger is in its normal withdrawn position, a reservoir for the operating fluid having a connection with a restricted passage leading into the booster cylinder, operating to choke the outlet from the booster chamber to the reservoir when the plunger is actuated, and thereby develop pressure in the booster chamber, the head of said plunger having a cup packing ring operating to admit air into the booster chamber on the return movement of the plunger and thereby operating to admit air into the upper end of the reservoir and develop pressure in the same.

23. In hydraulic brake apparatus, a cylinder, a head in said cylinder formed with an opening and dividing said cylinder into a rear compartment and a forward compartment, a flexible packing associated with said head, and a plunger slidably mounted for reciprocation through the opening in said head, said plunger being formed with a port and the annular head being formed with a groove at times cooperating with said port for allowing passage of fluid from one side of the head to the other.

24. In fluid pressure apparatus, a cylinder, a head formed with an opening and positioned in said cylinder and dividing it into a forward chamber and a rear chamber, a plunger slidably mounted for reciprocation through the opening in said head and provided with a port, said head being formed with a groove for at times cooperating with said plunger port for affording communication between said forward chamber and said rear chamber, and a flexible packing associated with said head.

25. In fluid pressure apparatus, a cylinder, a head formed with an opening and positioned in said cylinder and dividing it into a forward chamber and a rear chamber, and a plunger slidably mounted for reciprocation through the opening in said head, said plunger being formed with a passageway, and said head being formed with a port at times registering with said passage-way for affording communication between said forward chamber and said rear chamber.

26. In hydraulic brake apparatus, a cylinder, an annular head secured within said cylinder in fluid tight relationship with the sides thereof, a cylindrical plunger slidably passing through said annular head and formed with a recess at the forward end thereof, and a packing cup secured to the forward side of said head and contacting in fluid tight sealing relationship with said plunger, coacting passages being formed through said head and through said plunger for allowing communication between the portion of the cylinder in rear of said head and the portion of the cylinder in front of said head when said plunger is in its normal retracted position.

27. In hydraulic brake apparatus, a master cylinder having an annular head positioned therein, a cylindrical plunger slidably mounted for reciprocation through said head, an annular packing secured to said head for at times preventing the passage of fluid rearwardly past said head, and an annular packing secured to said plunger adjacent the rear end thereof and contacting with the walls of said cylinder for preventing the passage of fluid rearwardly by said plunger packing, said plunger being formed with a recess extending rearwardly from the front end thereof and with a lateral passage extending through the walls of said plunger so positioned that when the plunger is in its normal rearward position the passage is just rearward of said first named packing.

28. In hydraulic brake apparatus a master cylinder having an annular head positioned therein forming a pressure creating chamber in advance thereof, an annular packing secured to said head for at times preventing the passage of fluid rearwardly past said head, a cylindrical solid plunger having its forward portion slidably mounted for reciprocation through said head and packing for creating a brake applying pressure in said chamber ahead of said packing, and an annular packing secured to said plunger at its rearward portion, slidably contacting with the walls of the cylinder and coacting with said rearward portion of the plunger for preventing the passage rearwardly of fluid past the rearward end of the plunger.

29. In hydraulic brake apparatus, rear brakes, front brakes, an annular head formed with a bore and positioned in said master cylinder for dividing it into a pair of chambers one of which is connected to the forward brakes and one of which is connected to the rear brakes, a liquid supply reservoir, a fluid connection leading from said supply reservoir to said bore in said head, and means comprising a pair of opposed packing secured on opposite sides of said head for preventing passage of fluid to said bore from said chambers while allowing the passage of fluid from said bore to said chambers.

30. In a fluid actuated brake apparatus for operating brake cylinders, the combination of a master cylinder having a compression chamber, and having a booster chamber with a head between the said chambers, means comprising a plunger guided to slide through the said head and constantly in contact with said head for developing pressure in the booster chamber and in the compression chamber, means for connecting the compression chamber to the brake cylinders, and a packing ring for packing the plunger at the head and operating to permit the liquid under pressure in the booster chamber to flow past it into the compression chamber when the plunger is advanced to apply the brakes.

31. In a fluid actuated brake apparatus for operating brake cylinders in combination, a master cylinder having a compression chamber for the fluid and having a booster chamber and a head separating said chambers, means comprising a plunger guided to slide through said head for developing pressure in the compression chamber, means for holding the plunger normally in a retracted position with the forward end of the plunger lying in the compression chamber, and a reservoir connected with the booster chamber for maintaining a booster pressure, said head having a passage therein communicating with the booster chamber, and said plunger having a port communicating with the passage when the plunger is in its retracted position for opening communication between the booster chamber and the compression chamber.

32. In a fluid actuated brake apparatus for operating brake cylinders in combination, a master cylinder having a compression chamber and having a booster chamber, a head between said chambers, means comprising a plunger guided to slide through said head for developing pressure in the booster chamber and in the compression chamber, means for connecting the compression chamber to the brake cylinders, and a packing ring for packing the plunger at the head and operating to permit the liquid under pressure in the booster chamber to flow past it into the compression chamber when the plunger is advanced to apply the brakes.

EUGENE G. CARROLL.

CERTIFICATE OF CORRECTION.

Patent No. 1,943,886.　　　　　　　　　　　　　　　　January 16, 1934.

EUGENE G. CARROLL.

It is hereby certified that error appears in the printed specification of the the above numbered patent requiring correction as follows: Page 7, line 70, claim 19, for ",the chamber of" read of the chamber,; and that the said Letters Patent should be read with this correction therein that the same may conform to the record of the case in the Patent Office.

Signed and sealed this 19th day of March, A. D. 1935.

(Seal)

Leslie Frazer
Acting Commissioner of Patents